United States Patent
Söderquist

(10) Patent No.: US 7,922,154 B2
(45) Date of Patent: Apr. 12, 2011

(54) FUEL SUPPLY ASSEMBLY

(75) Inventor: Magnus Söderquist, Mölndal (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 12/404,129

(22) Filed: Mar. 13, 2009

(65) Prior Publication Data

US 2009/0212448 A1 Aug. 27, 2009

Related U.S. Application Data

(63) Continuation of application No. PCT/SE2006/001052, filed on Sep. 14, 2006.

(51) Int. Cl.
*F02M 7/12* (2006.01)

(52) U.S. Cl. .. 261/23.3; 123/73 PP; 261/45; 261/DIG. 1

(58) Field of Classification Search .................. 261/23.2, 261/23.3, 45, 54, 63, DIG. 1; 123/73 PP
See application file for complete search history.

(56) References Cited

U.S. PATENT DOCUMENTS

| 7,011,298 | B2* | 3/2006 | Gerhardy et al. | ............... 261/46 |
| 7,258,327 | B2* | 8/2007 | Prager | ............................. 261/46 |
| 7,694,943 | B2* | 4/2010 | Mason et al. | ................ 261/23.3 |
| 2004/0051186 | A1 | 3/2004 | Gerhardy et al. | |
| 2006/0163755 | A1* | 7/2006 | Prager | .............................. 261/46 |
| 2007/0257379 | A1* | 11/2007 | Mason et al. | ................ 261/44.6 |
| 2009/0212448 | A1* | 8/2009 | Soderquist | .................... 261/64.2 |

FOREIGN PATENT DOCUMENTS

| DE | 10345653 A1 | 4/2005 | |
| DE | 102004009310 A1 | 9/2005 | |
| EP | 1221545 A2 | 7/2002 | |
| JP | 57-83651 A | * 5/1982 | .................. 261/23.3 |

* cited by examiner

*Primary Examiner* — Richard L Chiesa
(74) *Attorney, Agent, or Firm* — Novak Druce + Quigg LLP

(57) ABSTRACT

A fuel supply assembly for a two-stroke crankcase scavenged combustion engine that is operated with layered scavenging is presented. The assembly includes a housing and a first and second parallel channels extending through the housing. The first channel is for a fuel/air mixture and the second channel is for auxiliary air. The assembly also includes a partition wall extending in a plane between the first and second channels and arranged upstream and downstream of at least one butterfly valve. The assembly also includes a protruding section which extends across the butterfly along the axis of rotation at least on the downstream side of the butterfly. The housing includes fuel-conveying idling ducts that open in the first channel in the region where the butterfly valve, sealing member on the partition wall, substantially contacting the protruding section at least on the downstream side of the butterfly.

10 Claims, 4 Drawing Sheets

FUEL SUPPLY ASSEMBLY

CROSS-REFERENCE TO RELATED APPLICATIONS

The present application is a continuation of International Application No. PCT/SE2006/001052, filed 14 Sep. 2006, which was published in English pursuant to Article 21(2) of the Patent Cooperation Treaty, said application is hereby incorporated by reference in its entirety.

TECHNICAL FIELD

The present disclosure generally relates to a fuel supply assembly for a two-stroke crankcase scavenged combustion engine that is operated with layered scavenging.

BACKGROUND

Fuel supply assemblies are disclosed in EP 1.221.545 A2, DE 10345653 A1 and DE 102004009310 A1. In the fuel supply assembly disclosed in EP 1.221.545 A2, a carburettor is provided with a butterfly valve (throttle valve) with a butterfly (throttle disc). When turned to full throttle, the butterfly valve closes an aperture in the partition wall and thereby ensures that all fuel flows into the channel defined as a first channel, while substantially pure air flows through a second channel. In part throttle conditions, however, the aperture in the partition wall is partially open allowing most of the fuel to flow into the first channel. A portion, which apparently can be considerable, will also flow into the second channel, resulting in increased losses of fuel into an exhaust port of the engine.

The assembly disclosed in DE 10345653 A1 employs a carburettor of the same design as EP 1.221.545 A2, and it is specifically mentioned that the openings between the two channels, which are established when the butterfly has adopted a slightly opened position, promote an equalisation of the pressure in the air channel, i.e. in the second channel, when the two stroke engine operates with a low load.

Also, the assembly disclosed in DE 1002004009310 A1 employs a carburettor with a butterfly valve, which, in all positions except full load position will leave a passage-way through the partition wall on the downstream side as well as on the upstream side of the butterfly. The openings in the partition wall are much smaller than those of the two foregoing prior art disclosures, but they are still large enough to cause a considerable amount of fuel to escape from the first channel into the second channel, i.e. into the auxiliary air channel. In order to reduce this flow of fuel into the auxiliary air channel, and hence reduce the content of fuel in that channel, a baffle element is provided in the first channel, i.e. in the channel for conducting the air/fuel mixture. However, every element located in the first channel—the air/fuel mixture channel forms an obstacle for the flow of the air/fuel-mixture, and this is particularly a drawback when full gas is desired.

DETAILED DISCLOSURE

The present disclosure includes the establishment of an aperture in the transition wall between the first channel, i.e. the channel for the fuel/air mixture, and the second channel, i.e. the channel for auxiliary air, is neither necessary nor desirable. This especially concerns the establishment of any passage between the channels on the downstream side of the butterfly(disc). Instead, the disclosure aims at securing a seal between the two channels in all positions of the butterfly, wherein the seal is sufficiently efficient for preventing any non-negligible passage of fuel from the first channel for the fuel-air mixture and the second channel for auxiliary air on the downstream side of the butterfly. This is achieved, according to an aspect of embodiments of the disclosure, by an edge of the partition wall, or a sealing member on the partition wall, that substantially contacts or nearly contacts the protruding section on the butterfly at least on the downstream side of the butterfly.

It is a well known phenomenon that the flow of fuel, air and mixtures thereof in any two-stroke engine inlet channel pulsates due to the principle of operation of the two-stroke engine. As a matter of fact, the pulsation can be so severe that fuel may be drawn backwards all the way to the air filter that conventionally is provided upstream of the carburettor or of the corresponding fuel supply assembly. Therefore, according to another aspect of embodiments of the disclosure, a protruding section, which extends across the butterfly along the axis of rotation, is provided also on the upstream side of the butterfly, wherein an edge of the partition wall, or a sealing member on the partition wall, contacts or nearly contacts the protruding section at least on the upstream side of the butterfly, securing a seal also on that side of the butterfly between the two channels in all positions of the butterfly, sufficiently efficient for preventing any non-negligible passage of a fuel from the first channel to the second channel on the upstream side of the butterfly. The seals can also prevent any non-negligible passage of air from the second channel to the first channel on either side of the butterfly, which might in prior art assemblies be significant because of the pulsating character of the flow in the two channels.

Aspects of the disclosure are intended in the first place to be applied on a throttle valve provided in a carburettor or other fuel supply unit for a two-stroke crankcase scavenged combustion engine but may be applied on a choke valve as well. Even if the choke valve is located between the air filter and the carburettor, fuel may be drawn back all the way beyond the throttle, as has been explained above, and therefore it is advantageous to prevent any leakage of fuel from the first channel to the second channel via the throttle valve and via the choke valve, when a valve is partially open.

The above mentioned seal can be affected in different ways through proper design of the edge of the partition wall or of the sealing member on the partition wall, adapted to a proper design of the protruding section of the butterfly. If the edge of the partition wall, or the sealing member of the partition wall, is designed in order to contact the protruding section of the butterfly, it may be convenient to design the edge of the partition wall, or the contacting portion of the sealing member, as a tongue made of a resilient material, for example a durable plastic material. As an alternative, the contacting member of the partition wall or, more conveniently, the sealing member on the partition wall, may be made of a thin, resilient steel material, for example a piece of a thin, cold rolled steel of the type that is conventionally used for flapper valves. The protruding section in these cases may very well be quite low, i.e. protruding only slightly above the surface of the main part of the partition wall. This is advantageous because it means that the protruding section will not form a severe obstacle to the flow of fuel/air mixture or the flow of auxiliary air in the first and second channel, respectively.

In the case the edge of the partition wall, or the sealing member on the partition wall, does not contact but only nearly contacts the protruding section of the butterfly on either side thereof, the protruding section in question may have a circular-cylindrical surface within at least that region which will face the edge of the partition wall or the sealing member on the partition wall as the butterfly is being rotated.

Suitably, the protruding section of the butterfly, or at least the protruding section on one side of the butterfly, will form a shaft, or part of a shaft, of the butterfly valve, whereas the protruding section on the opposite side of the butterfly will form a member included in the means for securing the butterfly to the shaft. In this connection it should be emphasised that the shaft necessarily need not be circular in cross section. It is sufficient that the shaft journals (the necks) which are journalled in the valve housing, are cylindrical, while the protruding section on either side of the butterfly, which interconnects the necks may be given any shape that provides sufficient strength to the protruding section for its role as interconnecting section at the same time as it shall be able to cooperate with the edge of the partition wall, or the sealing member on the partition wall, in order to provide the desired sealing action.

It is a general objective of the operation with layered scavenging of two-stroke crankcase scavenged combustion engines to reduce emissions, particularly at high engine loads. These scavenging systems, also known an air-head systems, have considerably improved the two-stroke engines in terms of reduced emission of harmful agents, such as total hydro carbons, carbon monoxide, carbon dioxide. This is, however, mainly true for emissions generated when the engine operates with high load, while the harmful emissions, according to prior art technique, can be significant when the engine operates under intermediate loads. According to the present disclosure a fuel concentration level in the auxiliary air channel, i.e. in the second channel, due to an escape of not more than 5%, suitably less than 1%, of the fuel supplied to the fuel/air mixture channel, i.e. to the first channel, from the first channel into the second channel via the throttle valve when the butterfly of the throttle valve is in an intermediate position, is acceptable. In other words, the leakage of fuel from the first channel into the second channel in that case would be negligible, which therefore also is a first definition of the above used phrase "negligible passage of fuel from the first channel into the second channel". If the edge of the partition wall, or a sealing member on the partition wall, contacts the protruding section on either side of the butterfly, any passage of fuel which is non-negligible will be effectively prevented. If the edge of the partition wall, or a sealing member on the partition wall only nearly contacts the protruding section on either side of the butterfly, also any non-negligible passage of fuel from the first channel to the second channel will be prevented also when the butterfly is in an intermediate position. "Nearly contact" in this connection, according to an aspect of the disclosure, means that a distance between the edge of the stationary partition wall, or the sealing member on the partition wall, and the protruding section on the rotatable butterfly, should be less than about 1 mm, in another embodiment less than about 0.5 mm and in yet another embodiment less than about 0.3 mm. However, the distance in at least one embodiment is greater than zero. This allows for a slight gap, which can prevent wear. In at least one embodiment, the distance can be about 0.05 mm.

BRIEF DESCRIPTION OF THE DRAWINGS

Further aspects and advantages of the disclosure will be apparent from the following description of some conceivable embodiments. In the description, reference will be made to the accompanying drawings, in which.

Figure 1:
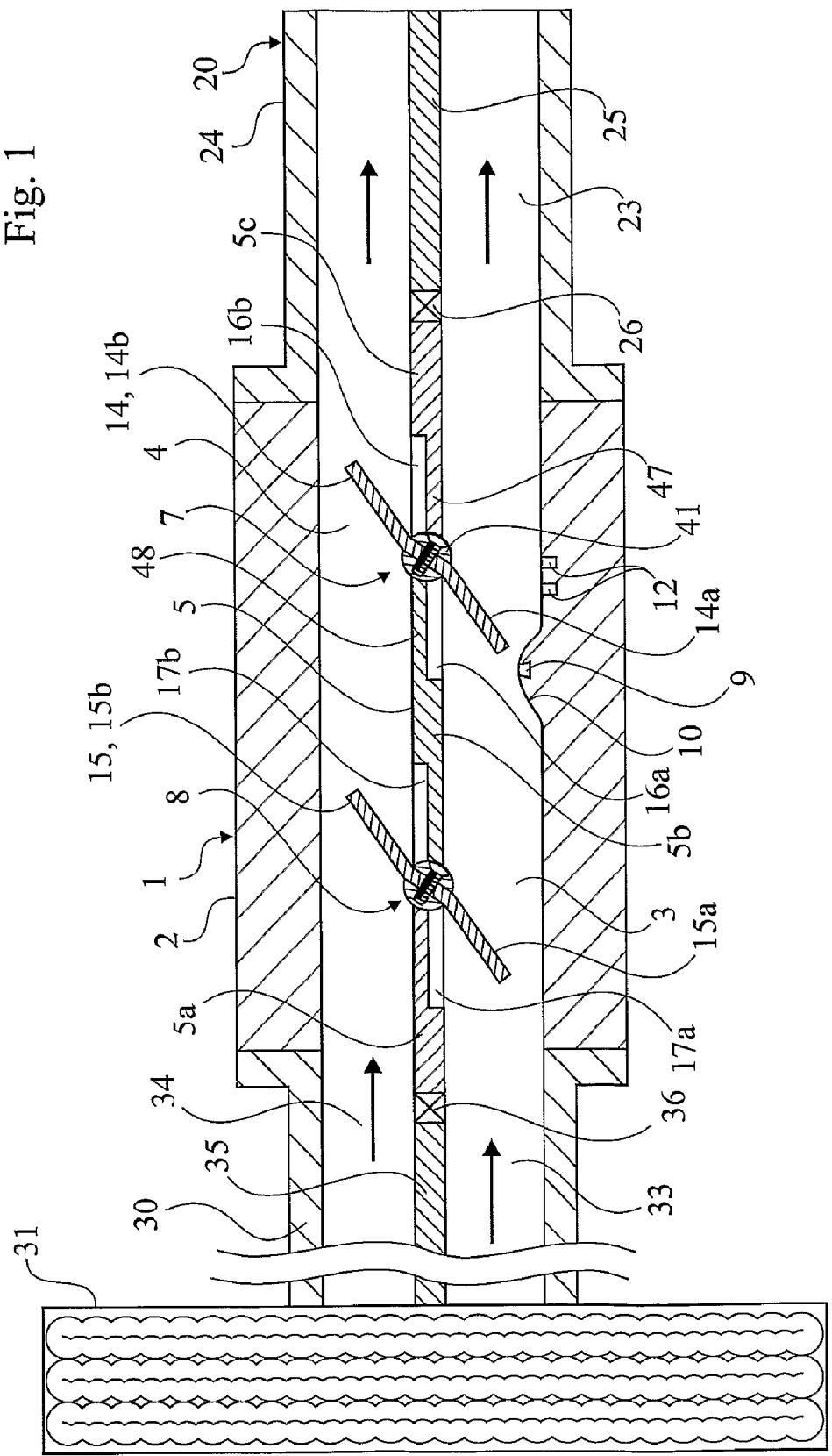
FIG. 1 schematically illustrates a longitudinal cross section of a fuel supply assembly according to a first conceivable embodiment of the disclosure.

In the drawings, which schematically illustrate principals of the disclosure, dimensions are not according to scale. This particularly concerns the thickness of the butterflies (discs) of the valves as well as of the partition wall included in the assembly.

DETAILED DESCRIPTION OF THE EMBODIMENTS

With reference first to FIG. 1, a fuel supply system, such as a carburettor, is generally designated 1 and its housing is designated 2. Two parallel channels extend through the housing, namely a first channel 3 for a fuel/air mixture and a second channel 4 for auxiliary air. The channels 3, 4 preferably have an approximately semi-circular cross section and are separated from one another by a partition wall, which is generally designated 5 and extends in a plane between the channels. However the channels 3,4 could also have an oval or square cross section. In the embodiment illustrated in FIG. 1, the partition wall consists of three sections, viz. a first or entrance section 5a, a second or central section 5b, and an exit or third section 5c. The partition wall sections 5a, 5b and 5c may be secured in their positions by slots in the wall of the housing 2.

The carburettor 1 includes a throttle valve, designed as a butterfly valve 7. The fuel supply assembly of the embodiment can also optionally contain a choke valve 8, as is shown in FIG. 1. A fuel conveying main channel 9 opens in a venturi section 10 upstream of the throttle/butterfly valve 7, and fuel-conveying idling ducts 12 open in the first channel 3 in the region of the throttle/butterfly valve 7.

The butterflies (discs) 14 and 15 of the throttle valve 7 and of the throttle valve 8, respectively, in a conventional way have a shape such that they can close the first channel 3 and the second channel 4, respectively, when they are independently rotated to fully closing positions. In the fully open positions of the valves, the flow regulating wings 14a, 14b and 15a, 15b of the butterflies 14 and 15, respectively, are accommodated in recesses in the partition wall 5 to minimize the influence of the butterflies on the flow pattern of the fuel/air mixture and of the auxiliary airflow, respectively. Thus, the wing 14b will be accommodated in a recess 16b on the side of the third partition wall section 5c facing the second channel 4. The wing 14a will be accommodated in a recess 16a in the central partition wall section 5b facing the first channel 3. The wing 15b of the choke valve 8 will be accommodated in a recess 17b in the central partition wall section 5b facing the second channel 4, and the wing 15a of the choke valve 8 will be accommodated in a recess 17a in the first partition wall section 5a facing the first channel 3. FIG. 1 shows the butterfly valves 7 and 8 in intermediate positions between fully open and fully closed positions.

The carburettor 2 is attached to an intake pipe 20 of a two-stroke crankcase scavenging engine of the type operating with layered scavenging, for example of the air-head type. The intake pipe 20 is separated to include a first channel 23 for the fuel/air mixture and a second channel 24 for auxiliary air, which shall not contain fuel exceeding a non-negligible level of concentration regardless the position of the throttle valve 7. A partition wall 25 is located between the first and second channels 23 and 24. The partition wall 25 is attached to the exit section 5c of the partition wall 5 of the carburettor 1 via a coupling 26. Similarly, partitioned air channels in an air tube of hose 30; namely, a first air channel 33 and a second air channel 34, separated by a partition wall 35, are connected to the carburettor 1 on the carburettor's entrance side. The partition wall 35 is attached to the entrance section 5a of the partition wall 5 of the carburettor 1 via a coupling 36. An air filter 31 is also illustrated.

Figure 2:
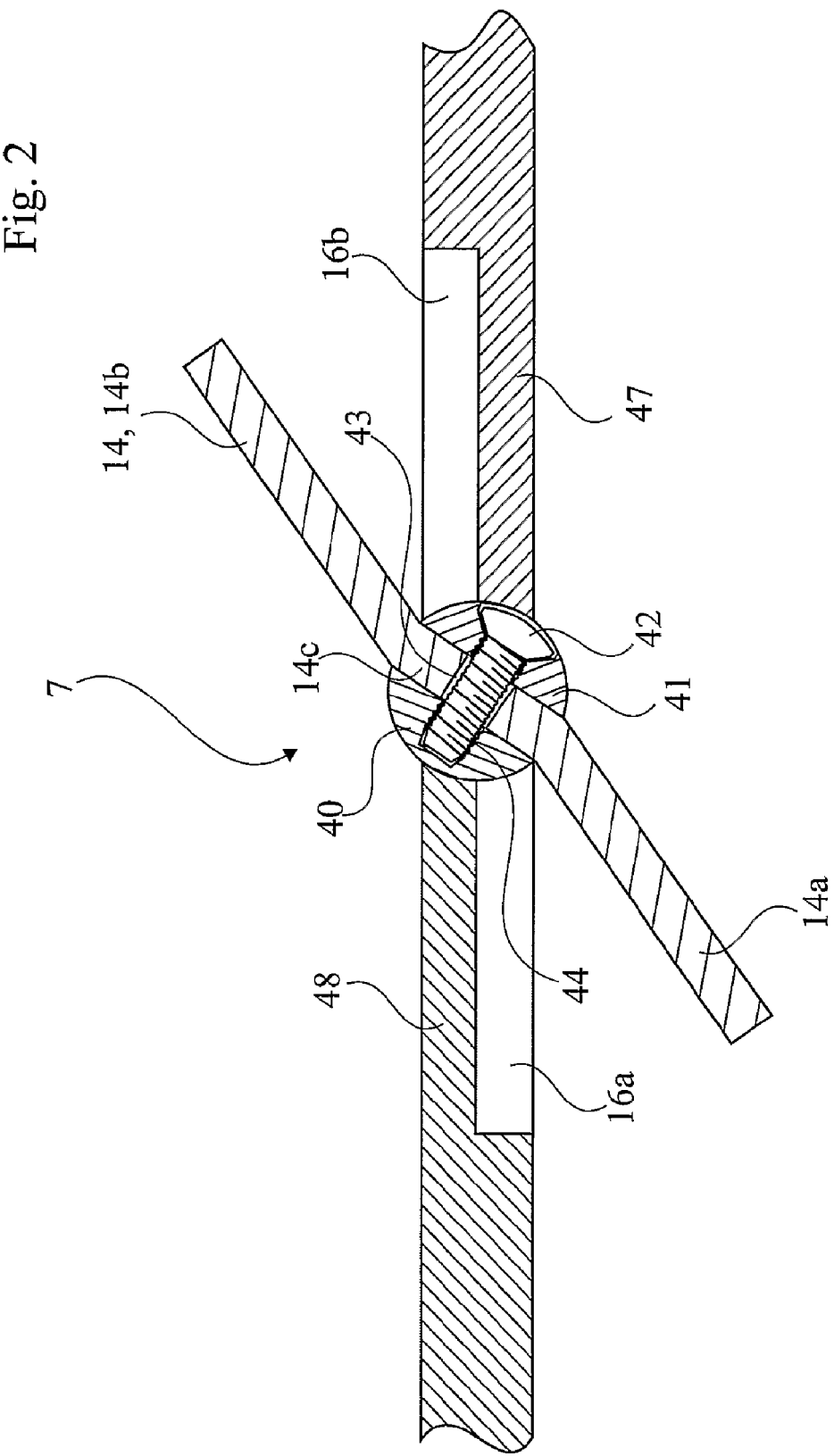
FIG. 2 illustrates the principles of a butterfly valve included in the assembly according to a first embodiment of the disclosure.
Figure 3:
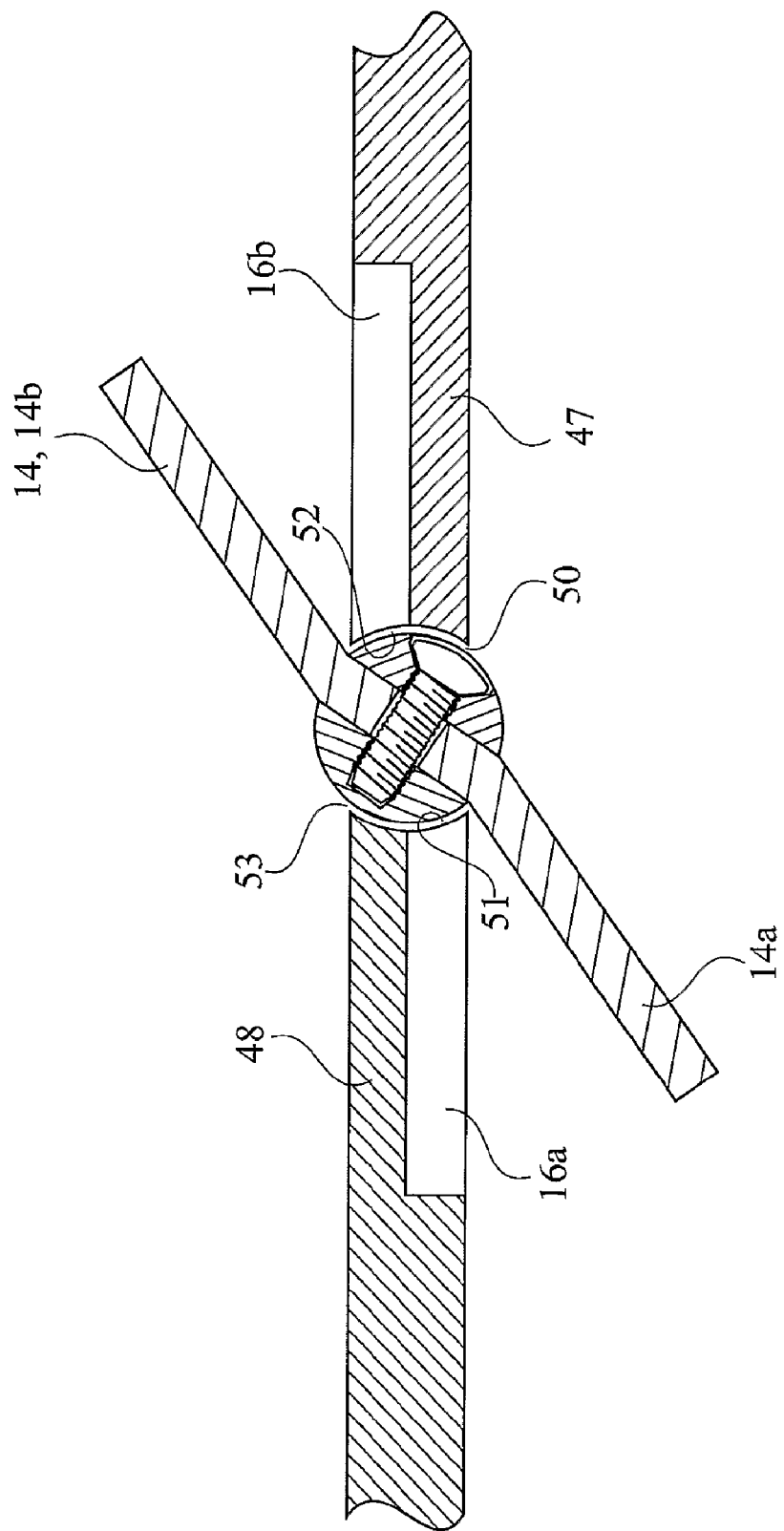
FIG. 3 illustrates a second embodiment of the butterfly valve.
Figure 4:
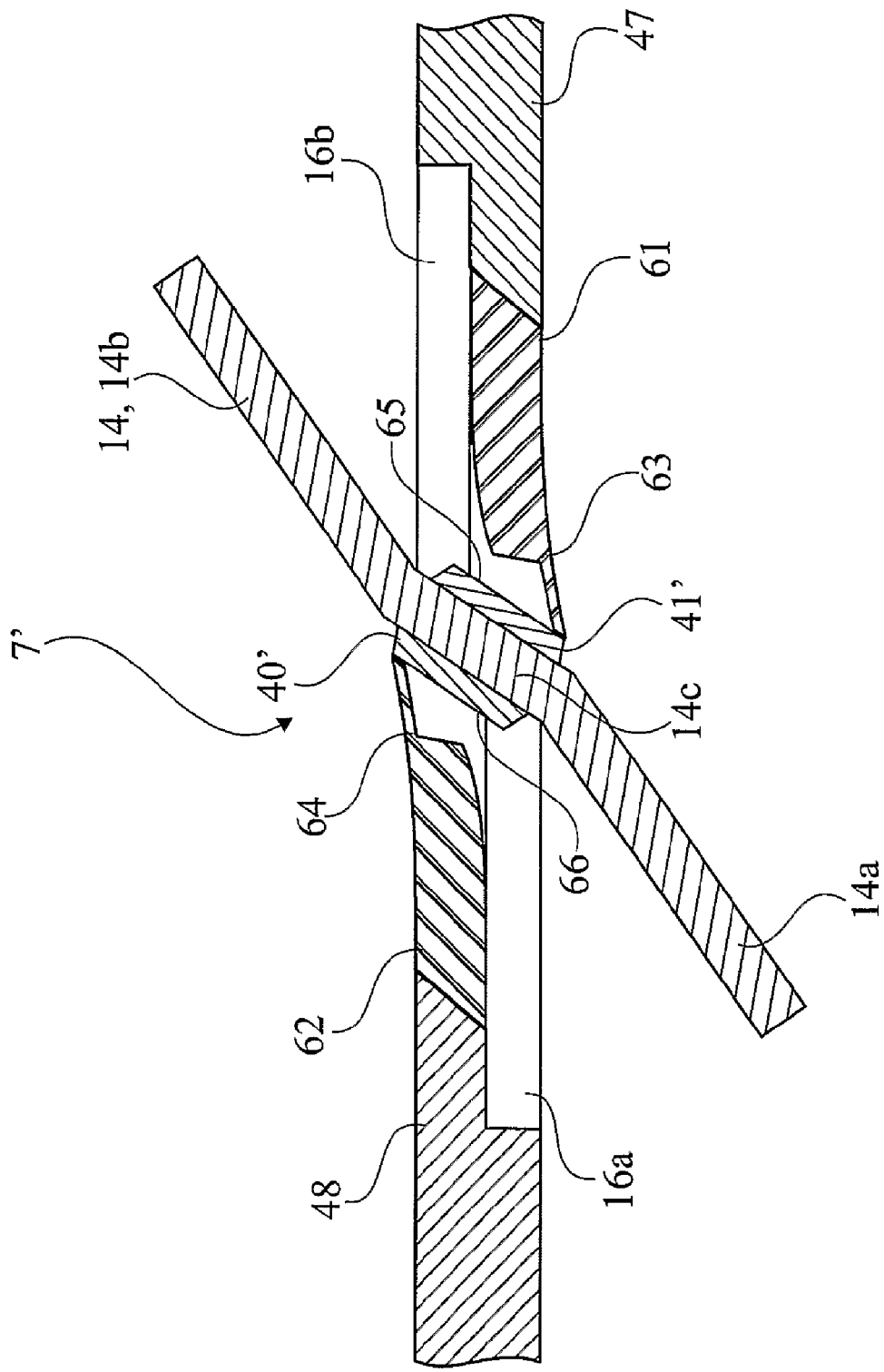
FIG. 4 shows a third embodiment of the butterfly valve.

Embodiments of the disclosure specifically relate to the central part of the throttle/butterfly valve 7 and conveniently also to the corresponding part of the choke/butterfly valve 8 as well as to the parts of the partition wall 5, which adjoin or are positioned close to the valve or valves. Reference therefore now is made to FIGS. 2-4, which show the details more clearly at a larger scale.

FIG. 2. illustrates a central section 14c of the butterfly 14 of the throttle valve 7 that is clamped between an axle shaft section 40 and a clamping member 41. The axle shaft section 40 and the clamping member 41 have cylindrical outer surfaces and form, in combination with the central section 14c of the butterfly 14, a cylindrical body according to the embodiment. The butterfly 14 is attached to the axle shaft section 40 by means of a screw 42 extending through a through-boring 43 in the clamping member 41 and through a hole in the central section 14c of the butterfly 14 into a threaded hole 44 in the axle shaft section. A head of the screw 42 is recessed in the clamping member 41.

According to the embodiment shown in FIG. 2, the tongue-shaped member 47 of the exit section 5c of the partition wall 5, located under the recess 16b, contacts the cylindrical surface of the clamping member 41, providing a seal between the first channel 3 and the second channel 4 on the down stream side of the butterfly 14 of the throttle valve 7 independent of the position of rotation of the valve. For that purpose the tongue, 47 or the entire section 5c, is made of a wear resistant and/or of a low friction material in order to withstand repeated rotations of the throttle valve 7. Materials can be selected from the group consisting of reinforced plastic materials, such as reinforced polyamide 6, steel, aluminum, antifriction materials such as copper-base bearing metals, and others. The clamping member 41 can be made of steel which provides a necessary strength to the clamping member, although other materials having a lower friction coefficient can be considered, such as copper-base bearing metal or plastic. On the opposite side of the butterfly 14, the part of the central section 5b of the partition wall 5 adjacent to the butterfly valve 7, as well as the axle shaft section 40 respectively, are designed in the same way as the corresponding members on the downstream side of the butterfly and the materials of the axle shaft section and of the central section 5b of the partition wall forming member of the seal of the throttle valve are conveniently selected for the corresponding members on the downstream side. It may also be convenient to provide the tip of the exit section 5c and the central section 5b of the partition wall facing the clamping member 41 and the axle shaft section 40 with a cylindrical surface having the same radius as the clamping member 41 and the axle shaft section 40, respectively, in order to promote the sealing action.

The choke valve 8 may be designed in the same way as has been described with reference to the throttle valve 7 and its design will therefore not be explained here in any further detail.

The embodiment described with reference to of FIG. 2, provides an efficient seal between the first and second channels 3 and 4, respectively. In the embodiment of FIG. 3, the tips of the tongue shaped portions 47 and 48 of the exit section 5c and of the central section 5b of the partition wall 5, respectively, do not contact the clamping member 41 or the axle shaft section 40, respectively. This eliminates any friction problem, which makes it possible to choose the materials of the clamping member 41 and of the axle shaft section 40 without any consideration of friction, steel being one example. The non-contact solution, however, requires that the gaps 50 and 51 between the tongues 47 and 48 on one hand and the clamping member 41 and the axle shaft section 40, respectively, on the other hand, are very narrow in order to ensure that the passage of fuel from the first channel 3 to the second channel 4 or auxiliary air from the second channel 4 to the first channel 3 is maintained at a negligible level. For that purpose each of the gaps 50 and 51 has a width which does not exceed about 1.0 mm, in another embodiment does not exceed about 0.5 mm, and in yet another embodiment does not exceed about 0.3 mm. Conveniently, the surfaces 52, 53 of the tongues 47 and 48 facing the clamping member 41 and axle shaft section 40, respectively, are concave cylindrical surfaces, approximately matching the cylindrical surfaces of the rotating members of the throttle valve 7'.

In the embodiment of FIG. 2, the portions of the partition wall 5 which contact the rotating, cylindrical surfaces of the throttle valve 7 are made of a stiff material or of a material which at least has a low degree of flexibility. The embodiment of FIG. 4 in contrast employs resilient, flexible sealing members 61 and 62, respectively. More particularly, the sealing members 61 and 62 form a tip portion on the tongue 47 and 48, respectively, while the main part of the tongues 47 and 48 form integrated parts of the exit section 5c and of the central section 5b of the partition wall, respectively, which in this case can be made of steel or other metal. As shown in FIG. 4, the sealing members 61 and 62 are slightly curved, wherein deflected portions 63 and 64 of the sealing members are resiliently pressed against the clamping member 41' and the axle shaft section 40', respectively. This eliminates the need of cylindrical surfaces on the clamping member 41' and on the axle shaft section 40', respectively. Therefore, the members 41' and 40' can be made less protruding than the cylindrical members of the previously described embodiments as illustrated in FIG. 4. The clamping member 41' and the axle shaft section 40', according to the embodiment, thus are made comparatively flat. Surfaces 65 and 66 of the axle shaft section 40' and of the clamping member 41', respectively, which are contacted by the resilient sealing members 61 and 62, respectively, are flat and parallel with the central section 14c of the butterfly 14. Suitably, the flexible sealing member 61 and 62 consist of a plastic material such as polyamide 6.

What is claimed is:

1. A fuel supply assembly for a two-stroke crankcase scavenged combustion engine that is operated with layered scavenging, said assembly comprising:
a housing and a first and second parallel channels extending through the housing, wherein the first channel is for a fuel/air mixture and the second channel is for auxiliary air;
a partition wall extending in a plane between said first and second channels and arranged upstream and downstream of at least one butterfly valve, and the at least one butterfly valve having a butterfly pivotally mounted in the housing, said butterfly valve having an axis of rotation coinciding with the plane of the partition wall, having a downstream side, and an upstream side; and
a protruding section which extends across the butterfly along the axis of rotation at least on the downstream side of the butterfly, wherein the housing includes fuel-conveying idling ducts that open in said first channel in the region of the butterfly valve, an edge of the partition wall, substantially contacting said protruding section at least on the downstream side of the butterfly, thereby securing a seal between the two channels in all positions of the butterfly.

2. The fuel supply assembly according to claim 1, further comprising a protruding section extending across the butterfly along the axis of rotation also on the upstream side of the butterfly, and an edge of the partition wall, substantially contacts said protruding section on the upstream side of the butterfly, thereby securing a seal between the two channels in all positions of the butterfly.

3. The fuel supply assembly according to claim 1, wherein the edge of the partition wall is made of a stiff material and contacts the protruding section of the butterfly facing said edge.

4. The fuel supply assembly according to claim 1, wherein the protruding section has a circular-cylindrical surface.

5. The fuel assembly according to claim 1, wherein the butterfly valve is a throttle valve.

6. The fuel assembly according to claim 1, wherein the butterfly valve is a choke valve.

7. A fuel supply assembly for a two-stroke crankcase scavenged combustion engine that is operated with layered scavenging, said assembly comprising:

a housing and a first and second parallel channels extending through the housing, wherein the first channel is for a fuel/air mixture and the second channel is for auxiliary air;

a partition wall extending in a plane between said first and second channels and arranged upstream and downstream of at least one butterfly valve, and the at least one butterfly valve having a butterfly pivotally mounted in the housing, said butterfly valve having an axis of rotation coinciding with the plane of the partition wall, having a downstream side, and an upstream side; and a protruding section which extends across the butterfly along the axis of rotation at least on the downstream side of the butterfly, wherein the housing includes fuel-conveying idling ducts that open in said first channel in the region of the butterfly valve, sealing member on the partition wall, substantially contacting said protruding section at least on the downstream side of the butterfly, thereby securing a seal between the two channels in all positions of the butterfly.

8. The fuel supply assembly according to claim 7, further comprising a protruding section extending across the butterfly along the axis of rotation also on the upstream side of the butterfly, and that a sealing member on the partition wall, substantially contacts said protruding section on the upstream side of the butterfly, thereby securing a seal between the two channels in all positions of the butterfly.

9. The fuel supply assembly according to claim 7, wherein the edge of the partition wall or the sealing member of the partition wall is made of a stiff material and contacts the protruding section of the butterfly facing said sealing member.

10. The fuel supply assembly according to claim 7, wherein the protruding section has a circular-cylindrical surface.

\* \* \* \* \*